United States Patent [19]

Moore

[11] Patent Number: 4,742,640
[45] Date of Patent: May 10, 1988

[54] LURE HOLDER

[75] Inventor: Michael L. Moore, Independence, Mo.

[73] Assignee: Moore Fishing Enterprises, Inc., Independence, Mo.

[21] Appl. No.: 401

[22] Filed: Jan. 5, 1987

[51] Int. Cl.⁴ ............................................. A01K 97/06
[52] U.S. Cl. .................................................... 43/57.1
[58] Field of Search ................. 43/57.1; 248/214, 300, 248/642; 403/199, 49; 256/65

[56] References Cited

U.S. PATENT DOCUMENTS

| | | | |
|---|---|---|---|
| 639,030 | 12/1899 | Haak . | |
| 1,900,035 | 3/1933 | Beck | 43/57.1 |
| 2,041,232 | 5/1936 | Collins . | |
| 2,143,119 | 1/1939 | Waring | 43/57.1 |
| 2,316,833 | 4/1943 | Baron | 43/57.1 |
| 2,317,517 | 3/1945 | Groulx . | |
| 2,332,036 | 10/1943 | Wilburn . | |
| 2,459,909 | 1/1949 | Alofs | 248/214 |
| 2,710,484 | 6/1955 | McGinnis . | |
| 2,791,863 | 5/1957 | Sweeney . | |
| 2,978,830 | 4/1961 | Killian . | |
| 2,990,150 | 6/1961 | Weigel et al. | 248/300 |
| 3,453,770 | 7/1969 | Schultz . | |
| 3,769,741 | 11/1973 | Hessler et al. . | |
| 3,859,747 | 1/1975 | Proebstle . | |
| 3,942,763 | 3/1976 | Helterbrand et al. | 256/65 |
| 3,989,213 | 11/1976 | Allen | 248/214 |
| 4,186,511 | 2/1980 | Slacter . | |
| 4,281,470 | 8/1981 | Anderson . | |
| 4,418,490 | 12/1983 | Ancona | 43/57.1 |
| 4,559,735 | 12/1985 | Batick | 43/25 |

Primary Examiner—M. Jordan
Attorney, Agent, or Firm—Hovey, Williams, Timmons & Collins

[57] ABSTRACT

A fishing lure holder is provided which safely and releasably secures the fishhook tips of fishing lures and which neatly displays the lures for convenient selection by fishermen. The preferred fishing lure holder includes a support body defining a U-shaped trough, means for mounting the body to a support surface with the trough opening upwardly, and resilient, synthetic resin material received within the trough. In use, the holder is preferably mounted to the upper surface of a boat gunwale or to the lower surface of a boat seat by hook-and-loop fasteners or by screws. Lures can then be neatly arranged on the holder for convenient removal therefrom by embedding the tips of the hooks in the material with the shank of the hooks and bodies of the lures extending downwardly along the exterior of the holder.

10 Claims, 1 Drawing Sheet

LURE HOLDER

BACKGROUND OF THE INVENTION

1. Field of the Invention

This invention relates to a lure holder of simple yet highly effective construction which has numerous advantages including safety and the ability to neatly store fishing lures for convenient removal therefrom. More particularly, it is concerned with a lure holder having a support body defining a U-shaped trough, means for mounting the body to a support surface with the trough opening upwardly, and resilient synthetic resin material filling the trough for releasably receiving the tip of a fish hook therein whereby the shank of the hook and the body of an attached lure extend downwardly along the outboard exterior of the holder.

2. Description of the Prior Art

In the art of using artificial lures for sport fishing, experienced fishermen have found that fish are attracted to different type of lures depending upon the type of fish, time of day, time of year, weather conditions, water temperature, water depth, and so forth. In an effort to find the particular lure most attractive to the fish, fishermen try a variety of lures in succession. To this end, various prior art devices have attempted to provide a means whereby lures may be safely and neatly presented for convenient access by the fisherman.

For example, U.S. Pat. No. 4,281,470 displays a body having a plurality of penetrable faces for insertion of one or more series of ganged hooks therein. Such a device, however, does not provide a practical means for mounting the device to the gunwale or seat of a boat which are desirable locations for convenient access by the fisherman. Additionally, such a device is not readily adaptable for safely securing the tips of lure hooks therein without the need for drawing tension on the hook in order to keep it securely confined. Furthermore, such a device does not receive the entire tip of the hook within the penetrable face and the barb of the hook is thus exposed thereby presenting a potential safety hazard.

U.S. Pat. No. 4,186,511 discloses a fishing lure box designed to be secured to the side of a boat for holding a plurality of fishing lures and which includes a block of elastomeric material into which the hooks of fishing lures are removably inserted. Such a device, however, is not readily mountable to the seat of a boat and furthermore requires the exposed face of the elastomeric material to be mounted vertically so that the material itself supports the weight of the lure thus subjecting the material to tearing when the lure is removed.

SUMMARY OF THE INVENTION

The problems outlined above are solved by the lure holder in accordance with the present invention. That is to say, the lure holder hereof is readily mountable to the gunwale or seat of a boat, and releasably secures the fishhook tips of fishing lures and neatly presents the lures for convenient selection by a fisherman.

The lure holder in accordance with the present invention broadly includes a support body having structure defining an elongated, upwardly opening, generally U-shaped in cross section trough; means for mounting the body to a support surface with the trough opening upwardly; and resilient means formed of synthetic resin material within the trough for permitting embedding of the hook tip therein with the shank of the fishing hook extending downwardly and exteriorly of the trough.

Preferably, the material includes yieldable, resilient, open cell styrofoam substantially filling the trough and extending above the upper level thereof. Additionally, the support body is preferably integrally composed of aluminum or synthetic resin material. The mounting means preferably includes an outwardly extending mounting wall coupled with the body. The mounting means further preferably includes hook-and-loop fasteners for releasably coupling the mounting wall to the support surface and alternatively the mounting wall is configured for receiving a mounting screw therethrough.

DESCRIPTION OF THE PREFERRED EMBODIMENT

Figure 1:
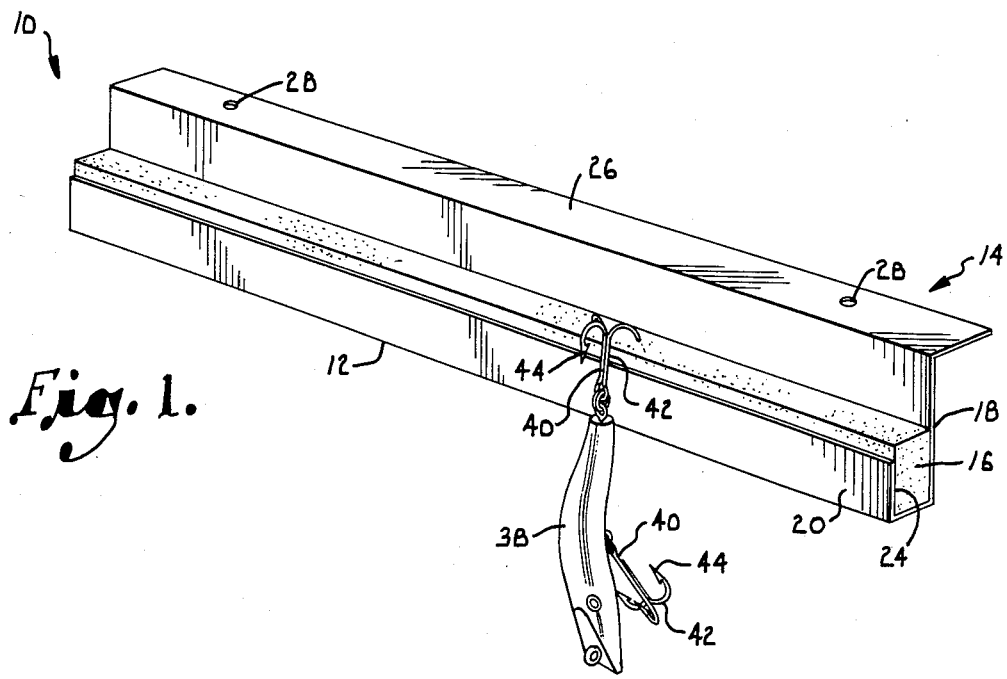
FIG. 1 is a perspective view of the preferred lure holder showing a fishing lure mounted thereto.

Referring now to the drawings, lure holder 10 includes support body 12, mounting means 14, and resilient synthetic resin material 16.

Support body 12 includes spaced-apart, generally parallel, respective inboard and outboard sidewalls 18 and 20, and bottom wall 22 integrally intercoupling sidewalls 18, 20. Support body 12 is preferably composed of anodized aluminum or synthetic resin material as a matter of designer's choice. Walls 18-22 define upwardly opening, material-receiving trough 24. Additionally, inboard sidewall 18 extends upwardly about twice the distance from bottom wall 22 as upward sidewall 20.

Preferred mounting means 14 is designed so that holder 10 is mounted with trough 24 opening upwardly and includes mounting wall 26 integrally coupled with the upper edge of inboard sidewall 18 and extending outwardly and orthogonally therefrom as shown in the drawing figures. Mounting wall 26 includes a pair of spaced-apart screw-receiving mounting holes 28 defined therein.

Figure 2:
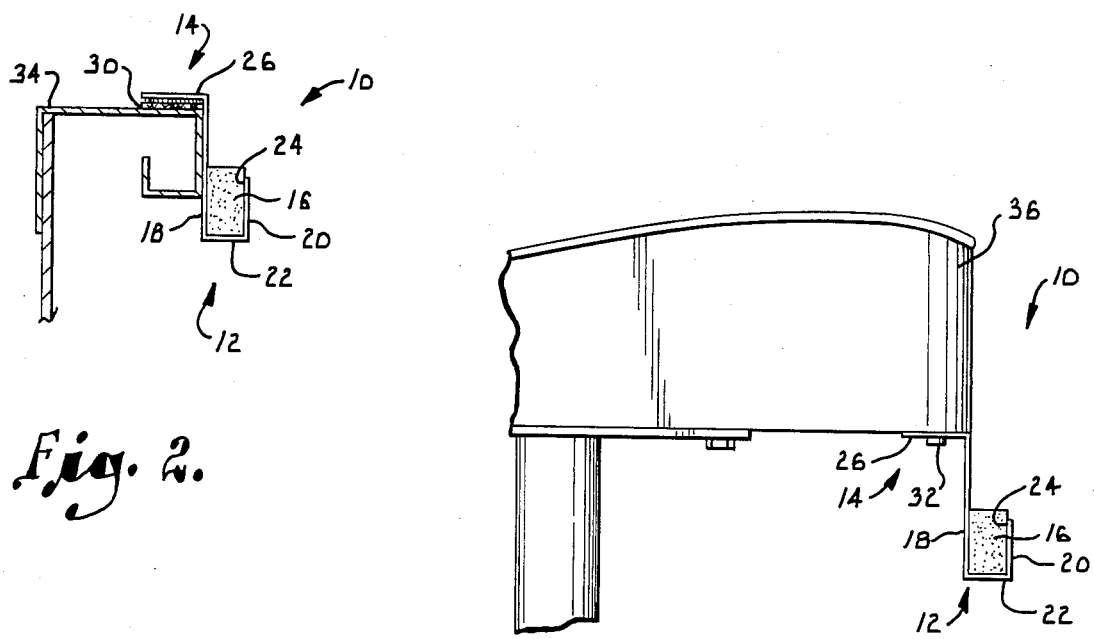
FIG. 2 is a side sectional view of the lure holder mounted to the gunwale of a boat by hook-and-loop fasteners.

Advantageously, lure holder 10 as illustrated in FIG. 2 includes hook-and-loop fasteners 30 which are sometimes known as VELCRO. Alternatively, mounting means 14 as illustrated in FIG. 3 includes a pair of mounting screws 32 received through holes 28.

Material 16 is preferably composed of yieldable, resilient, open-cell polyethylene foam such as that produced by The Sentinal Company of Hyannis Port, Mass. under the name of POLYLAM configured to snugly and slidably fit within trough 24. Material 16 substantially fills trough 24 and extends slightly above the upper edge of outboard sidewall 20. Desirably, the upper edge of outboard sidewall 20 tilts slightly toward inboard sidewall 18 in order to slightly compress material 16 therebetween and thereby to hold material 16 snugly within trough 24. The slidable fit of material 16 within trough 24 allows convenient removal therefrom for cleaning or replacement if needed.

In use, the unique design of lure holder 10 allows it to be mounted to a wide variety of horizontal or vertical surfaces as desired by the user. For example, as shown in FIG. 2, lure holder 10 is mounted to boat gunwale 34 so that hook-and-loop fasteners 30 are disposed between the lower face of mounting wall 26 and the upper surface of gunwale 34. This arrangement is particularly preferred because it allows lure holder 10 to be easily removed from gunwale 34 and because the use of hook-and-loop fasteners 30 does not require drilling or penetration of the boat surface. As one skilled in the art will appreciate, hook-and-loop fasteners 30 can be located instead between the inboard vertical surface of gunwale 34 and the exterior surface of inboard sidewall 18. Such may be desired if the upper surface of gunwale 32 is not flat, thus preventing effective use of that surface.

Figure 3:
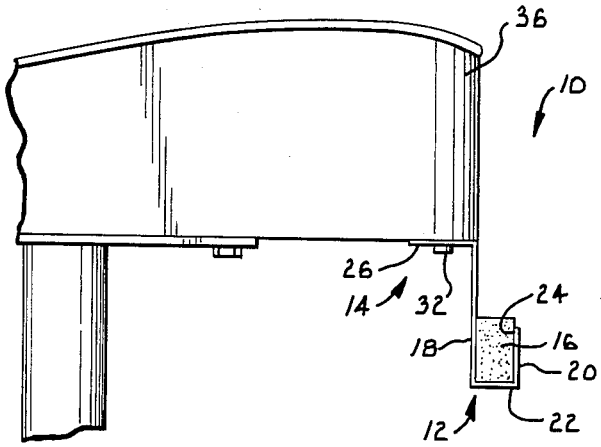
FIG. 3 is a side sectional view of the lure holder mounted to the underside of a boat seat by means of mounting screws.

Alternatively, for example, lure holder 10 can be mounted to the lower surface of a boat seat 36 as illustrated in FIG. 3. In this arrangement, mounting screws 32 are received through mounting holes 28 and into boat seat 36.

FIG. 1 illustrates typical placement of a fishing lure 38 on lure holder 10. As shown, a typical lure includes one or more fishing hooks 40 coupled thereto having a shank 42 and a tip 44. Lure 38 is placed by embedding top 44 into material 16. By doing so, shank 42 and the body of lure 38 coupled thereto extend downwardly and exteriorally of trough 24 along the outboard face of outboard sidewall 20. The weight of lure 38 and the barb associated with tip 44 prevent lure 38 from dislodging. The nature of material 16, however, allows convenient removal therefrom. Lure 38 is removed by grasping hook 40 and pulling upwardly which dislodges hook 40 from material 16.

As one skilled in the art will appreciate, a number of lures 38 can be neatly placed along the length of holder 10. With such placement, the lures are readily displayed and can be conveniently selected by the fisherman. Additionally, with this arrangement, the hooks of the lures will not become entangled. Also, the vertical motion of tip 41 in and out of material 16 minimizes the amount of tearing and damage to material 16. Furthermore, if an especially heavy lure is used, penetration of hook tip 42 into material 16 is limited by outboard sidewall 20 such that as tip 42 penetrates sufficiently deeply into material 16, the curved portion of shank 40 comes into contact with sidewall 20 and is supported thereby.

Those skilled in the art will appreciate that the present invention contemplates many variations in the preferred embodiment herein described. For example, mounting means 14 could include a pair of hook-shaped hangers attached to body 12 which could be slipped over the gunwale of a boat for mounting holder 10 thereto. Additionally, material 16 could also include rubber or the like for releasably holding a fishing hook therein.

Having thus described in detail the preferred embodiment of the present invention, what is claimed as new and desired to be secured by Letters Patent is:

1. A fishing lure holder for attachment to a support surface of a boat or the like, the fishing lure including a fishing hook having a shank and a tip, said lure holder comprising:
   a support body having structure defining an elongated, upwardly opening, generally U-shaped in cross section trough;
   means for mounting said body to the support surface with said trough opening upwardly; and
   resilient means formed of synthetic resin material within said trough for permitting embedding of said hook tip therein with the shank of the fishing hook extending downwardly and exteriorally of said trough,
   said support body including
      an inboard sidewall,
      and outboard sidewall, and
      a bottom wall intercoupling said sidewalls such that said outboard sidewall tilts slightly inwardly toward said inboard sidewall for slightly compressing said resilient means between said sidewalls in order to non-adhesively hold said resilient means within said trough.

2. The lure holder as set forth in claim 1, said material including yieldable, resilient, open-cell polyethylene foam substantially filling said trough and extending above the upper level thereof.

3. The lure holder as set forth in claim 1, said support body being integrally composed of aluminum.

4. The lure holder as set forth in claim 1, said support body being integrally composed of synthetic resin material.

5. The lure holder as set forth in claim 1, said mounting means including hook-and-loop fasteners.

6. The lure holder as set forth in claim 1, said mounting means including an outwardly extending mounting wall coupled with said body.

7. The lure holder as set forth in claim 6, said mounting means further including hook-and-loop fasteners for releasably coupling one face of said mounting wall to a support surface.

8. The lure holder as set forth in claim 6, said mounting means further including a mounting hole defined therein and configured for receiving a mounting screw therethrough.

9. The lure holder as set forth in claim 1, said trough having at least one open end for removing and installing said resilient means therethrough.

10. The lure holder as set forth in claim 1, said mounting means including means fixing said lure holder to said support surface for preventing slidable movement of said holder relative to said surface.

* * * * *